United States Patent [19]

Wurl

[11] Patent Number: 5,112,102
[45] Date of Patent: May 12, 1992

[54] VEHICLE BODY, PARTICULARLY FOR PASSENGER CARS

[75] Inventor: Willi Wurl, Niefern-Oeschelbronn, Fed. Rep. of Germany

[73] Assignee: Dr. Ing. h.c.F. Porsche AG, Fed. Rep. of Germany

[21] Appl. No.: 688,270

[22] Filed: Apr. 22, 1991

[30] Foreign Application Priority Data

Apr. 28, 1990 [DE] Fed. Rep. of Germany ....... 4013784

[51] Int. Cl.⁵ ............................................. B62D 23/00
[52] U.S. Cl. ................................... 296/204; 296/194; 296/29; 280/785
[58] Field of Search ............... 296/188, 189, 194, 204, 296/29; 280/785

[56] References Cited

U.S. PATENT DOCUMENTS

| | | | |
|---|---|---|---|
| 3,110,518 | 11/1963 | Wessells, III | 280/785 X |
| 4,030,772 | 6/1977 | Jacob et al. | 296/204 |
| 4,188,059 | 2/1980 | Baver et al. | 296/188 |
| 4,189,177 | 2/1980 | Schwuchow et al. | 296/188 |
| 4,469,368 | 9/1984 | Eger | 296/188 |
| 4,613,184 | 9/1986 | Rispeter et al. | 296/203 X |
| 4,887,862 | 12/1989 | Bassi | 296/204 |

FOREIGN PATENT DOCUMENTS

| | | | |
|---|---|---|---|
| 3119666 | 1/1982 | Fed. Rep. of Germany | 296/203 |
| 3346986 | 7/1986 | Fed. Rep. of Germany | . |
| 0195185 | 8/1989 | Japan | 296/204 |

Primary Examiner—Dennis H. Pedder
Attorney, Agent. or Firm—Evenson, Wands, Edwards, Lenahan & McKeown

[57] ABSTRACT

A vehicle body structure for a passenger car having a forward member and an exterior side member, where the forward member and the side member are formed by extruded profiles. A light metal junction connects the forward member and the side member, this junction being formed by a cast part and having first and second junction elements. The first junction element has an open end and a closed end and extends in the longitudinal direction of the vehicle for receiving an end of the forward member in the open end. A second junction element is aligned essentially transversely to the longitudinal direction of the vehicle and abuts and side member. This second junction element has a receiving channel that receives the first junction element. The body structure includes a floor and a transmission tunnel, with the second junction element abutting the floor and the transmission tunnel of the body structure. The first and second junction elements are additionally connected.

14 Claims, 3 Drawing Sheets

VEHICLE BODY, PARTICULARLY FOR PASSENGER CARS

BACKGROUND AND SUMMARY OF THE INVENTION

The present invention relates to a vehicle body, particularly for passenger cars, with a forward member of the body structure being connected to an exterior side member by means of a junction element. The forward member and the side member are formed by extruded profiles, and the junction element and is formed by a cast part and is preferably made of light metal.

From the German Patent Document DE-OS 33 46 986, a vehicle body for a passenger car is known in which a forward member of the body structure is connected to the side member by way of a junction element. In addition, an upright door pillar is connected to the junction element. The forward member, the side member and the door pillar are formed by extruded profiles made of light metal, whereas the junction element is constructed as a cast part made of light metal.

In order to be able to manufacture the junction element more easily, it is constructed to be open toward the top and is closed off by an additional closing part.

An object of the present invention is to provide a vehicle body that, in the connection area of the forward member and the side member, has a simple and low-cost mounting while ensuring a sufficient stiffness of the body structure in this area.

This and other objects are achieved by the present invention which provides a vehicle body structure comprising a forward member, an exterior side member and a junction element. The exterior side member and the forward member are formed by extruded profiles. The junction connects the forward member and the side member, this junction being formed by a cast part. The junction has a first junction element extending in the longitudinal direction of the vehicle for receiving an end of the forward member, and a second junction element aligned essentially transversely to the longitudinal direction of the vehicle and which interacts with the side member. The second junction element has a receiving device that receives the first junction element. There are means for additionally connecting the first and second junction elements.

Some of the principal advantages achieved by the present invention are that, by means of the arrangement of two junction elements, which can be connected with one another, in the connection area of the forward member and the side member, a simple and low-cost mounting of the body structure is achieved. In this case, one junction element is fixedly connected with the rearward end of the forward member and is assigned to a prefabricated forward structure. The other junction element, which extends in the transverse direction, is connected to the side member, the floor and the transmission tunnel, whereby a sufficient stiffness (bending and torsion) is achieved in the connection area of the forward member and the side member, as well as a good introduction of force from the forward member into the adjacent body structure.

By means of the arrangement of a transmission carrier below the second junction element and a fastening screw, the two junction elements, in addition, are screwed together with one another in an embodiment of the present invention. In addition, a pedal or a pedal system is fastened directly to the second junction element in a simple manner. Also, a recess-shaped receiving device is integrated into the second junction element and a threaded plate for the fastening of a wishbone can be inserted into the receiving device. The groove-shaped receiving device on the second junction element causes an automatic centering of the first junction element during the mounting.

Other objects, advantages and novel features of the present invention will become apparent from the following detailed description of the invention when considered in conjunction with the accompanying drawings.

DETAILED DESCRIPTION OF THE DRAWINGS

Figure 1:
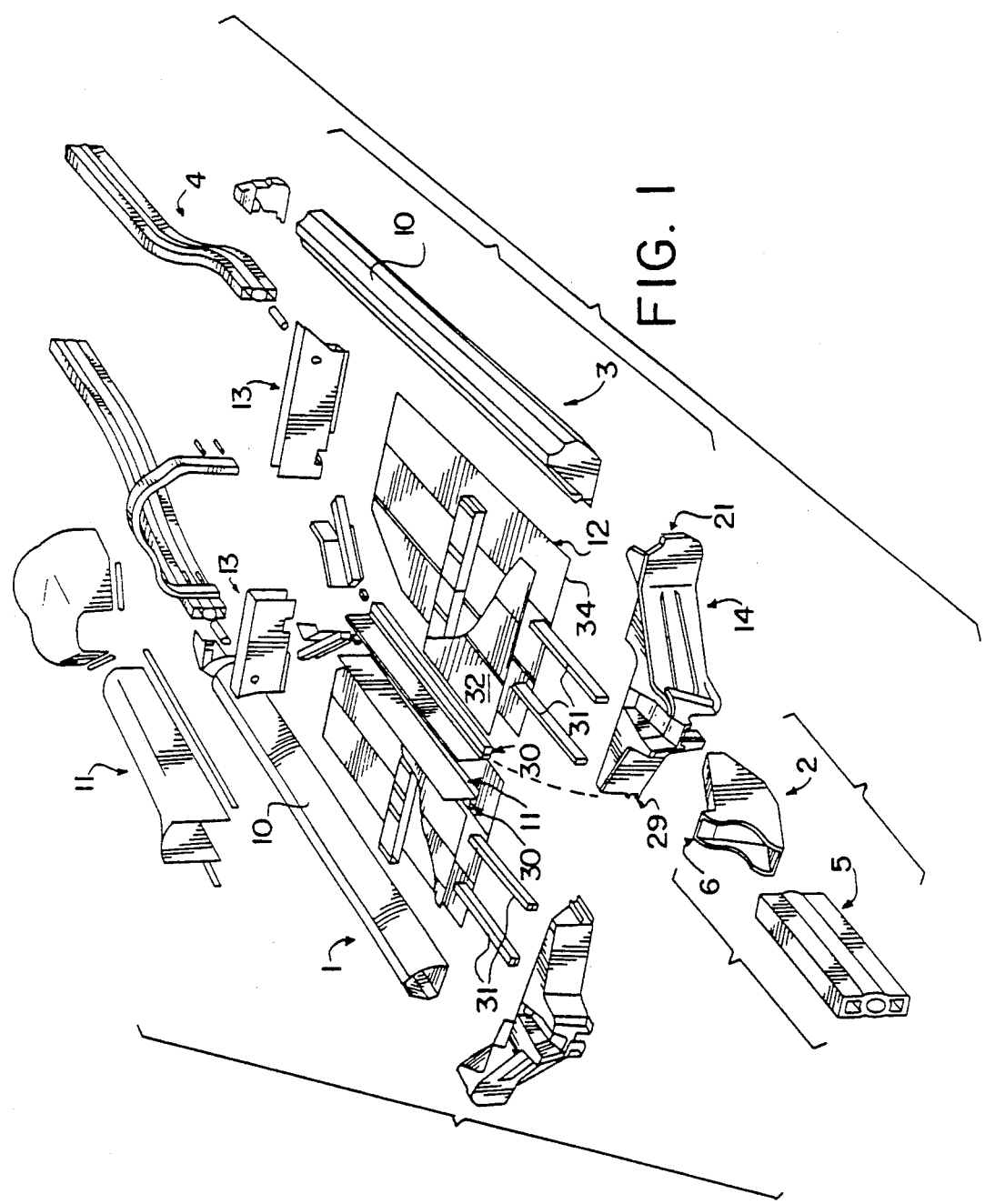
FIG. 1 is a perspective representation of a partial area of the supporting body structure of a passenger car constructed in accordance with an embodiment of the present invention.

FIG. 1 is an exploded representation of a partial area of a vehicle body 1 of a passenger car. In the shown area, the vehicle body 1 comprises a forward structure 2, a floor part or center part 3, and a rearward structure 4. The forward structure 2, the floor part or center part 3, and the rearward structure 4 are formed by prefabricated constructional units which are joined together during the assembly of the vehicle body 1. The forward structure 2 comprises two forward members 5 (of which only one is shown in FIG. 1 for illustration purposes) which are arranged at a distance from one another and which, in a manner not shown in detail, on their forward ends, are connected with one another by way of a cross member. On their rearward ends, the forward members 5 are received in first junction elements 6 and are fixedly connected with them. This may take place by welding, gluing, screwing, riveting, or the like. The first junction elements 6, which are constructed approximately in the shape of a shoe, extend around the forward member 5 from below, from the rear and from the direction of both longitudinal sides in a form-fitting manner. Toward the rear, the junction elements 6, which are constructed in the manner of a hollow body, are closed on all sides. The two longitudinal sides 7, 8 of the junction element 6 are recessed approximately in an L-shape (FIG. 2) in the connection area with the forward member 5 to 9.

Figure 5:
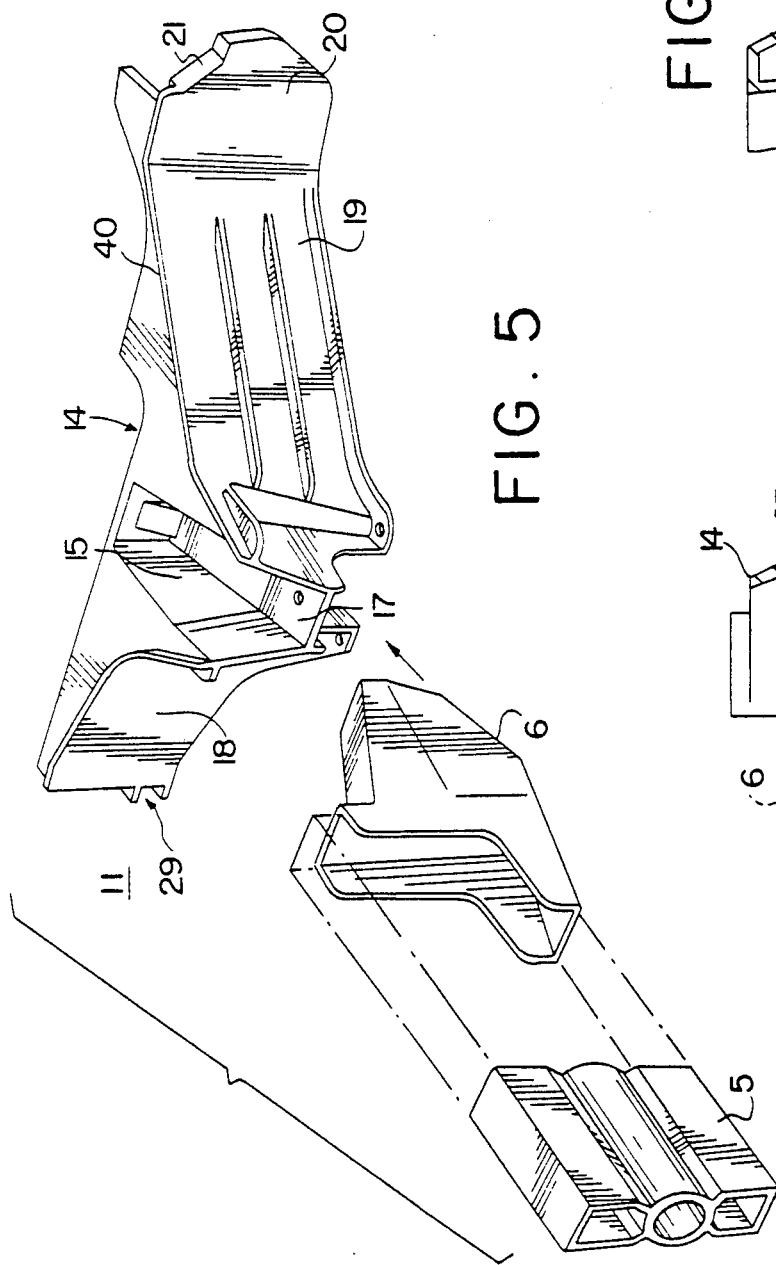
FIG. 5 is a perspective representation of the forward member and the two junction elements.

The floor part or center part 3 comprises essentially two laterally exterior side members 10, a transmission tunnel 11, a floor 12, and a seat cross-member 13. In addition, a second junction element 14, which extends in the transverse direction of the vehicle, is provided on the forward end area of the floor or center part 3 and is fixedly connected with the side member 10, the floor 12 and the transmission tunnel 11. The second junction element 14 has a groove-shaped receiving device 15 which extends as an extension of the forward member 5 or of the first junction element 6 and into which the first junction element 6 is inserted from above or from the front (FIG. 5). In addition, a connection is established between the two junction elements 6, 14 by means of welding, gluing, screwing, or the like. After the junction elements 6, 14 have been joined, a horizontal lower boundary surface 16 (FIG. 3) of the first junction element 6 rests on a surface 17, which extends in the same direction, of the second junction element 14 disposed underneath.

Figure 4:
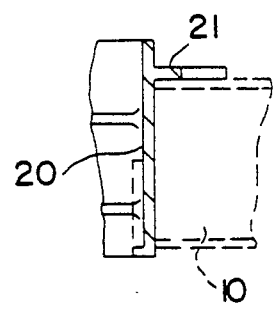
FIG. 4 is a vertical longitudinal sectional view of the second junction element and the side member along Line IV—IV of FIG. 2.

The groove-shaped receiving device 15 causes an automatic centering of the first junction element 8 in the receiving device 15 because the receiving device 15, viewed in the transverse direction, continuously tapers in the downward direction (a forming-out inclination). In the case of the second junction element 14, obliquely extending, vertical wall sections 18, 19 lead away on both sides of the groove-shaped longitudinally directed receiving device 15, one wall section 18 leading to the transmission tunnel 11, and the other wall section 19 extending in the direction of the side member 10 (FIG. 5). The wall section 19 leads into an end-side transverse wall 20 which closes off the side member 10. At the wall section 19, locally horizontally extending reinforcing ribs are provided in certain embodiments. A bent-over edge 21 of this transverse wall 20, in sections, surrounds an edge area of the side member 10 (see FIG. 4).

Figure 6:
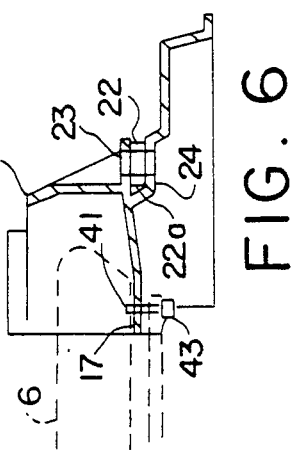
FIG. 6 is a sectional view along Line VI—VI of FIG. 2.

A recess-shaped receiving space 22 is provided on the second junction element 14 (FIG. 6) and, viewed in the vertical direction, is bounded by two spaced webs 23, 24. A threaded plate 22a can be slid into this receiving space 22. A wishbone, which is also not shown and which is arranged below the second junction element 14, can be fastened to the threaded plate 22a.

The threaded plate 22a can be inserted from the direction of the passenger compartment and extends approximately at the level of the surface 17 of the receiving device 15. On the side facing a passenger compartment 25 (FIG. 2), the second junction element 14 has a set-off legroom section 26. A pedal or a pedal system is screwed to a horizontal surface of the step-shaped legroom section 26. For this purpose, two threaded bores 28 are provided on a pedestal-type elevation 27 of the junction element 14.

On the side facing the transmission tunnel 11, the second junction element 14 has a U-shaped edge 29 which encloses a hollow section part 30 of the transmission tunnel 11. An additional connection may be provided between the edge 29 and the hollow section part 30 (welding, gluing, screwing, riveting, or the like).

Figure 2:
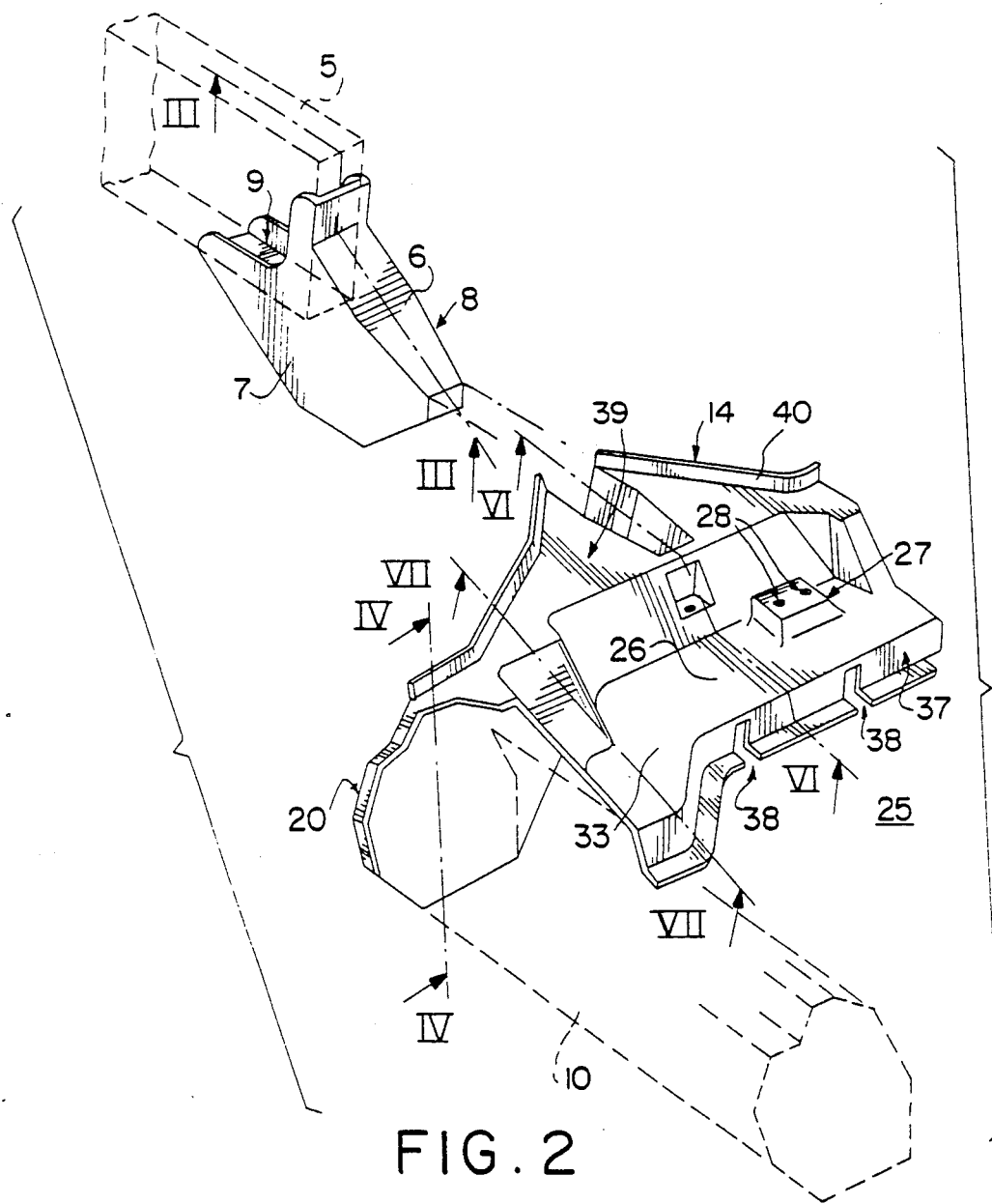
FIG. 2 is a view of the supporting body structure of the passenger car of FIG. 1 in the transition area between the forward member and the side member.
Figure 7:
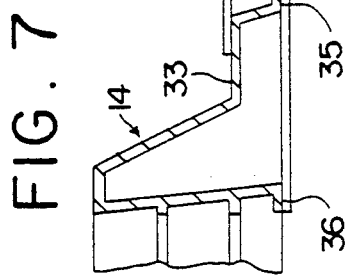
FIG. 7 is a sectional view along Line VII—VII of FIG. 2.

According to FIGS. 1 and 7, a double-walled floor 12 with locally arranged longitudinally extending webs 31 is connected to the second junction element 14. An upper floor plate 32 rests on the horizontal surface of the junction element 14, whereas a lower floor plate 34 is supported on horizontal flanges 35, 36 of the junction element 14 and is fastened to it. As seen in FIG. 2, a step-shaped bent-away part 37 facing the passenger compartment 25, in the area of the longitudinally extending webs 31 of the floor 12, is provided with recesses 38 so that the webs 31 can extend to the upright wall sections 18, 19 of the junction element 14 and are fixedly connected with it. On the approximately horizontal top side 39 of the junction element 14, a web 40, which locally is vertically bent upward, is provided to which a transversely extending front wall, which is not shown, and a wheel house of the body structure can be connected.

Figure 3:
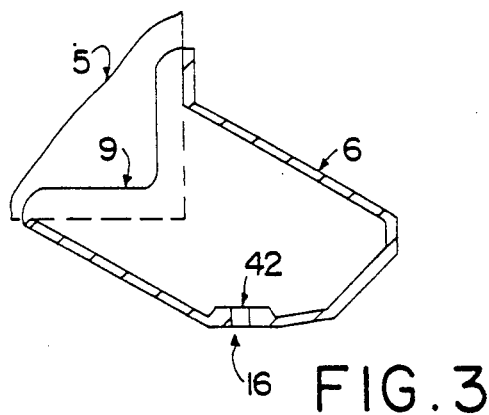
FIG. 3 is a vertical longitudinal sectional view of the forward member and the first junction element along Line III—III of FIG. 2.

Below the second junction element 14, a transversely extending transmission member is provided which is not shown. The transmission member rests on the underside of the second junction element 14 and, by means of a vertical fastening screw 43, is tightened from below against the second junction element 14. The fastening screw 43 extends through a passage opening 41 of the second junction element 14 (FIG. 6) and is screwed into a threaded bore 42 of the first junction element disposed above it (FIG. 3). An additional connection is therefore established between the two junction elements 6, 14. The threaded bore 42 is arranged on the horizontal surface 16 of the junction element 6. The forward member 5, the side member 10 and the transmission tunnel 11 are formed by hollow-section-type extruded profiles made of light metal, whereas the junction elements are constructed as cast parts made of light metal.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle body structure for a passenger car comprising:
    a forward member;
    an exterior side member, the forward member and the side member being formed by extruded profiles;
    a light metal junction connecting the forward member and the side member, said junction being formed by a cast part and having a first junction element having an open end and a closed end and extending in the longitudinal direction of the vehicle for receiving an end of the forward member in said open end, and a second junction element aligned essentially transversely to the longitudinal direction of the vehicle and which abuts the side member, said second junction element having a receiving channel that receives the first junction element, wherein the body structure includes a floor and a transmission tunnel, said second junction element abutting said floor and said transmission tunnel of the body structure; and
    means for additionally connecting the first and second junction elements.

2. A vehicle body structure according to claim 1, wherein the body structure has a prefabricated forward structure which includes the forward member received in the first junction element, and wherein the side member, the floor, the transmission tunnel and the second junction element form a prefabricated structural unit of a center part of the passenger car.

3. A vehicle body structure according to claim 1, wherein the first junction element encloses a rear end area of the forward member and is fixedly connected with said rear end area locally.

4. A vehicle body structure according to claim 3, wherein the forward member is connected to the first junction element by at least one of screwing, riveting, welding or gluing.

5. A vehicle body structure according to claim 1, wherein the forward member is connected to the first junction element by at least one of screwing, riveting, welding or gluing.

6. A vehicle body structure according to claim 1, wherein the first junction element extends in sections around the forward member from below, from the rear and from both longitudinal sides in a form-fitting manner.

7. A vehicle body structure according to claim 1, wherein the first and second junction elements, are connected with one another in the area of the channel by said additional connecting means, said additional connecting means being a vertically aligned fastening screw that tightens from below a transversely extending transmission member against the second junction element.

8. A vehicle body structure according to claim 7, wherein the second junction element has an opening and the first junction element has a threaded bore, the fastening screw being guided through said opening of the second junction element and is screwably received in said threaded bore of the first junction element.

9. A vehicle body structure according to claim 1, wherein the receiving device of the second junction element is groove-shaped and longitudinally extends in a center area of a transverse course of the second junction element, the receiving channel being open toward the front and top, and having first and second obliquely extending upright wall sections that lead away on both sides, said first wall section facing the side member and changing into a transverse wall closing off the side member.

10. A vehicle body structure according to claim 1, further comprising a threaded plate, and wherein the second junction element has a recess-shaped receiving space that receives the threaded plate, said recess-shaped receiving space being bounded in the vertical direction by two spaced horizontal webs, the threaded plate providing means for fastening a wishbone arm arranged below the second junction.

11. A vehicle body structure according to claim 1, wherein the second junction element has a leg room section on which means are provided to which a pedal or pedal system can be fastened.

12. A vehicle body structure according to claim 1, wherein the second junction element, on a side facing the transmission tunnel, has a U-shaped edge which is secured to and enclosing a hollow profile section of the transmission tunnel.

13. A vehicle body structure according to claim 1, further wherein the floor is a double-walled floor with locally arranged longitudinally extending webs abutting the second junction element.

14. A vehicle body structure according to claim 1, wherein the second junction element has a vertically bent-away, transversely extending upper web connectable to a front wall and a wheel house.

* * * * *